Figure 1:
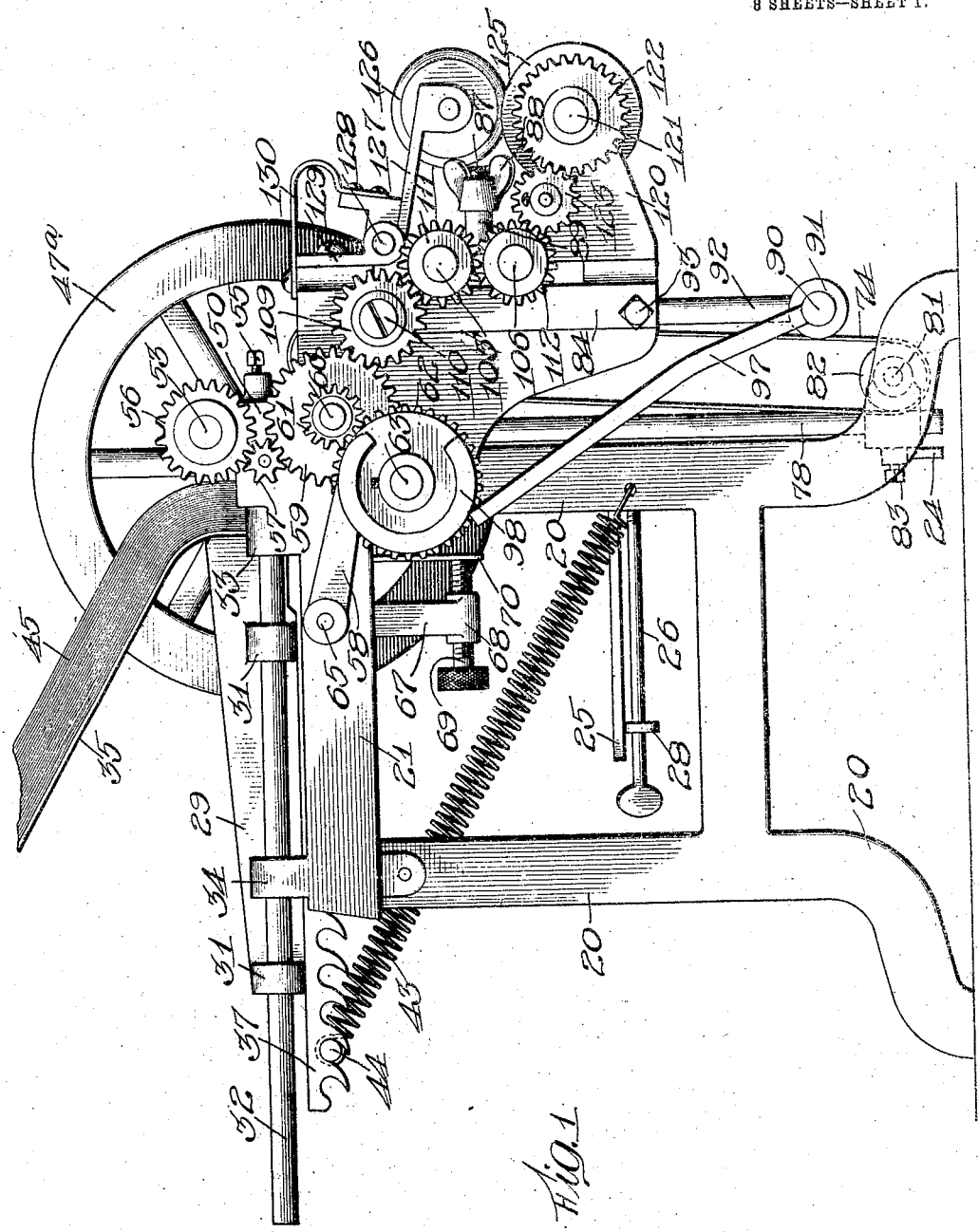

No. 839,313. PATENTED DEC. 25, 1906.
F. G. NIND & F. JULYAN.
PAPER FOLDING MACHINE.
APPLICATION FILED MAR. 19, 1906.

8 SHEETS—SHEET 1.

Witnesses:
J. V. Domarus
Robert H. Weir

Inventors
Frederick G. Nind
Frederick Julyan
by Bond, Adams, Pickard & Jackson
Attys

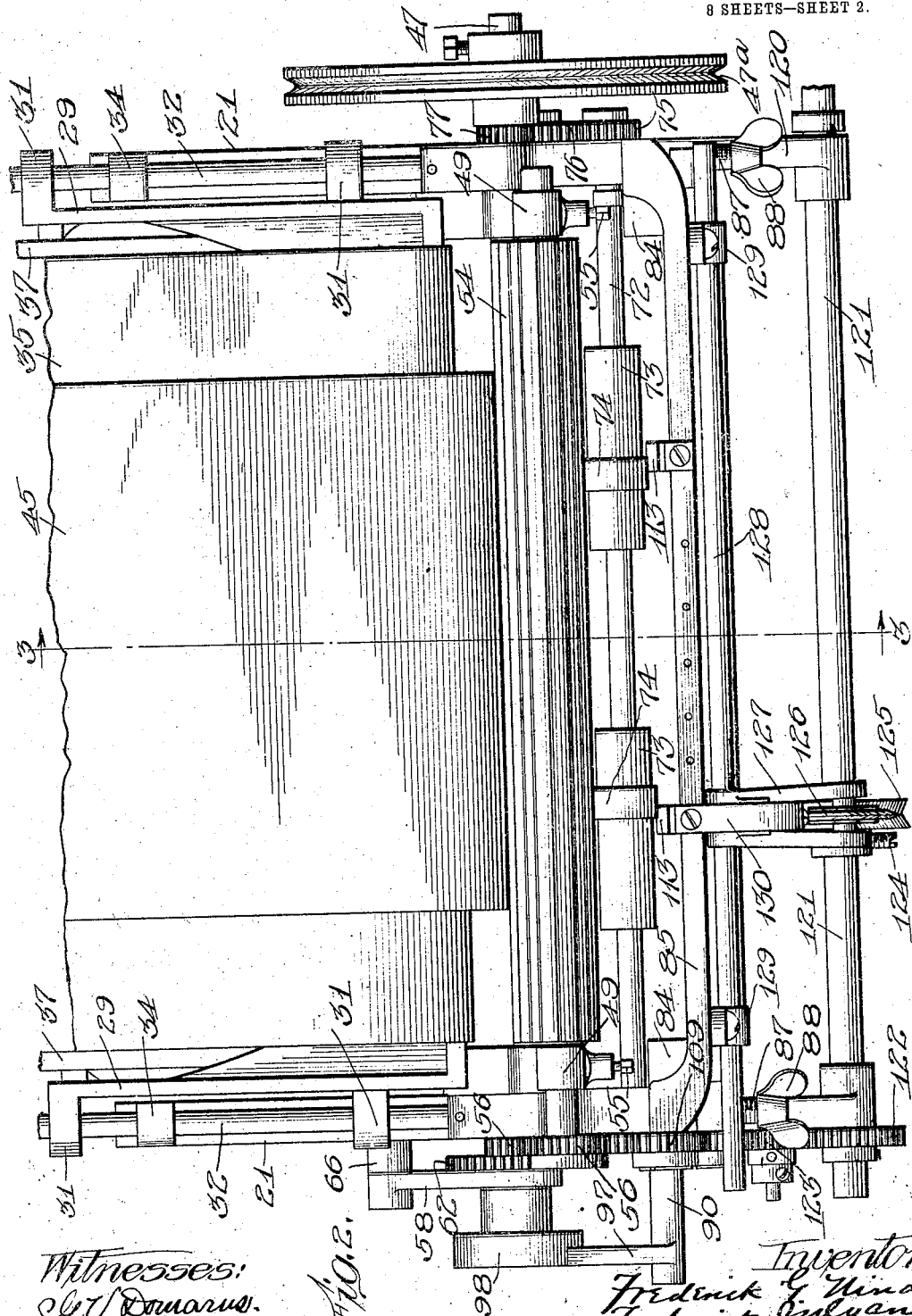

No. 839,313. PATENTED DEC. 25, 1906.
F. G. NIND & F. JULYAN.
PAPER FOLDING MACHINE.
APPLICATION FILED MAR. 19, 1906.
8 SHEETS—SHEET 3.
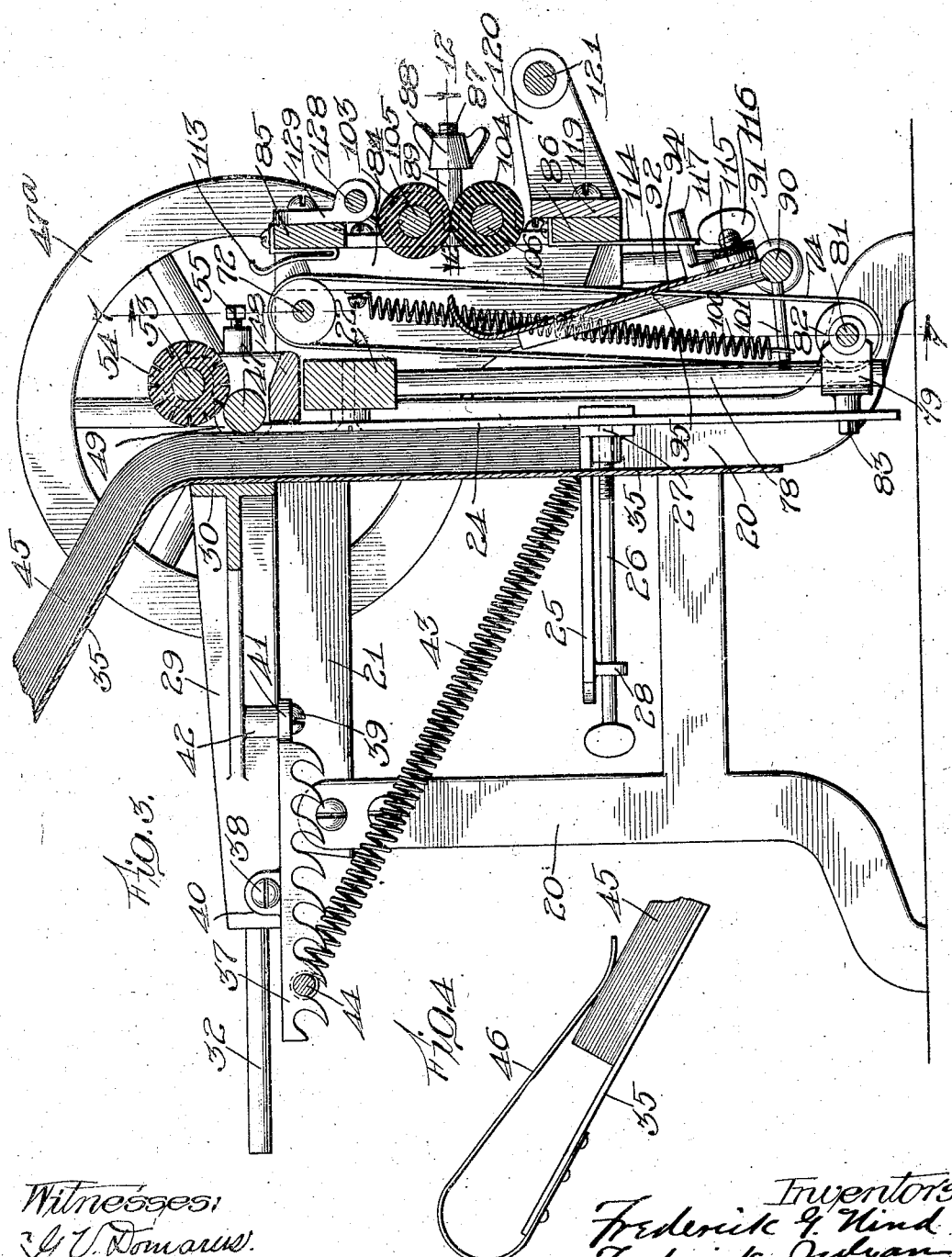
Witnesses:
Inventors.

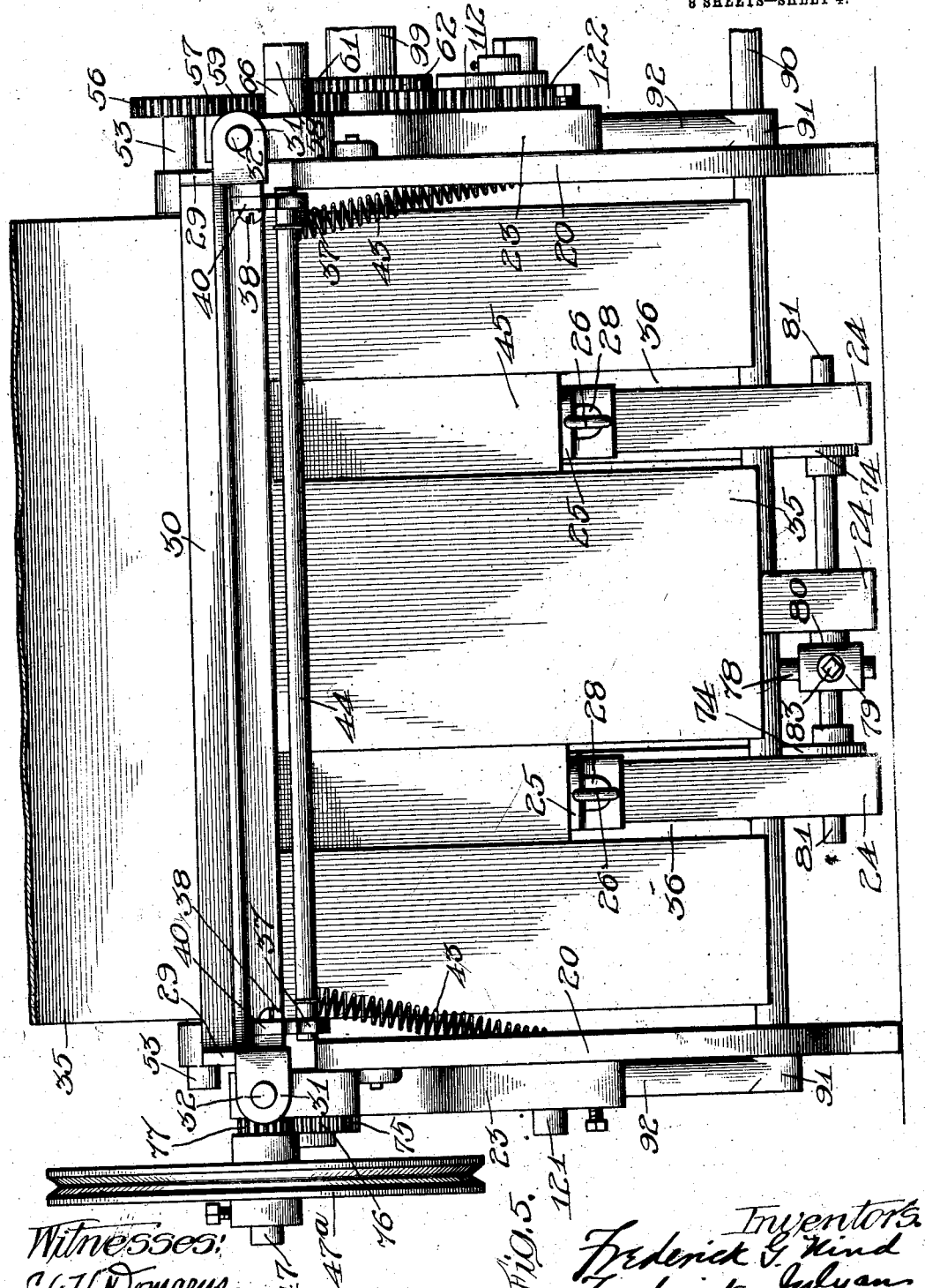

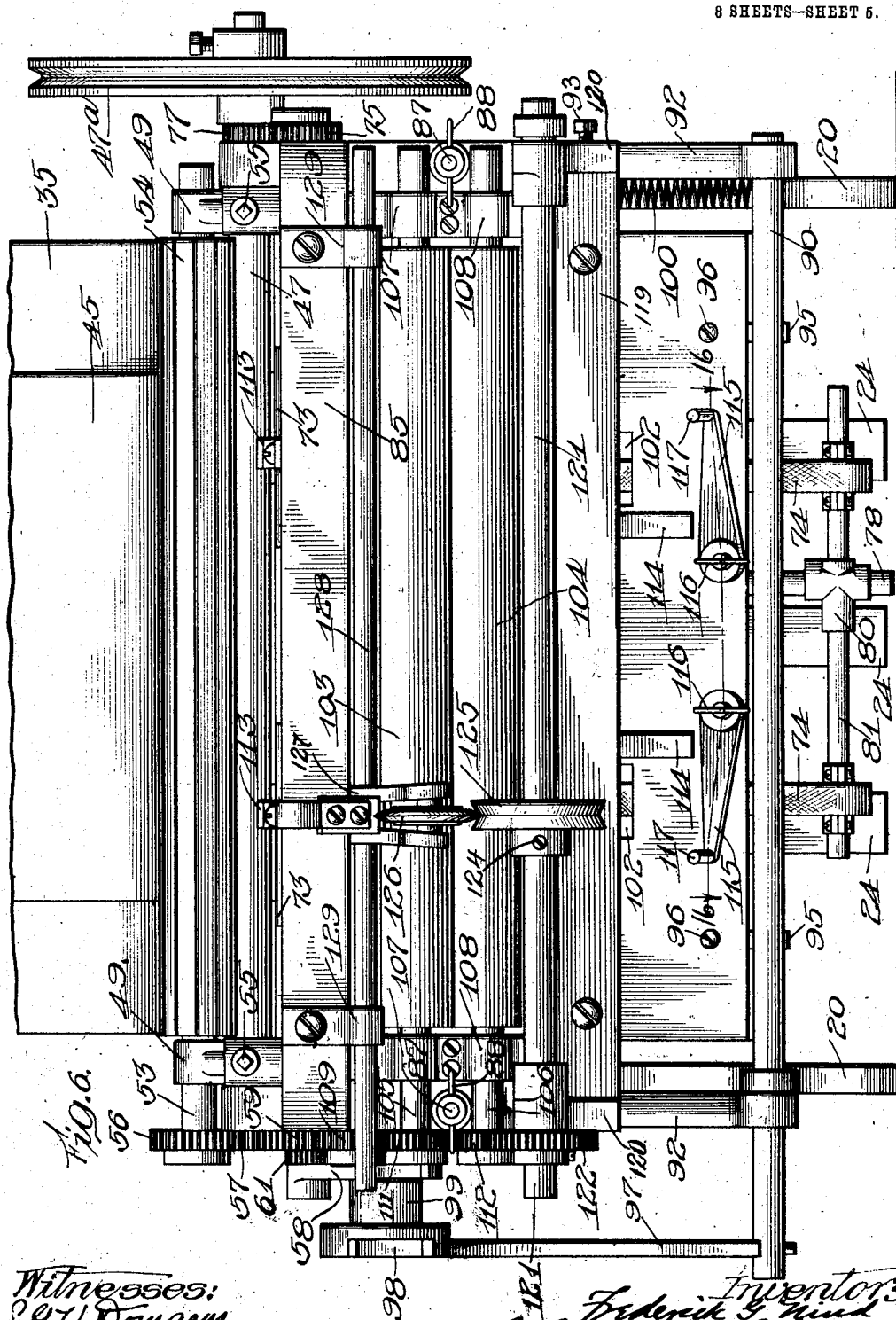

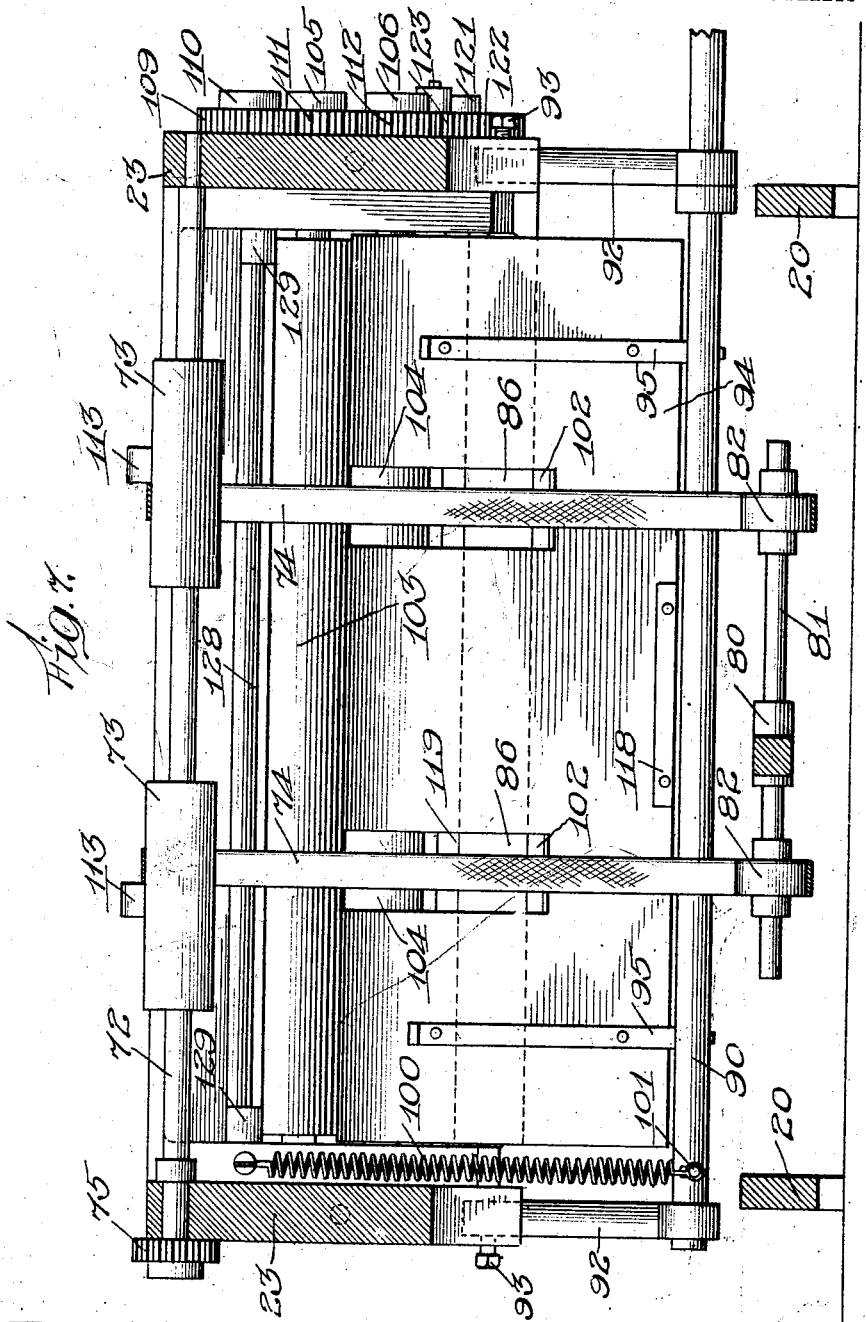

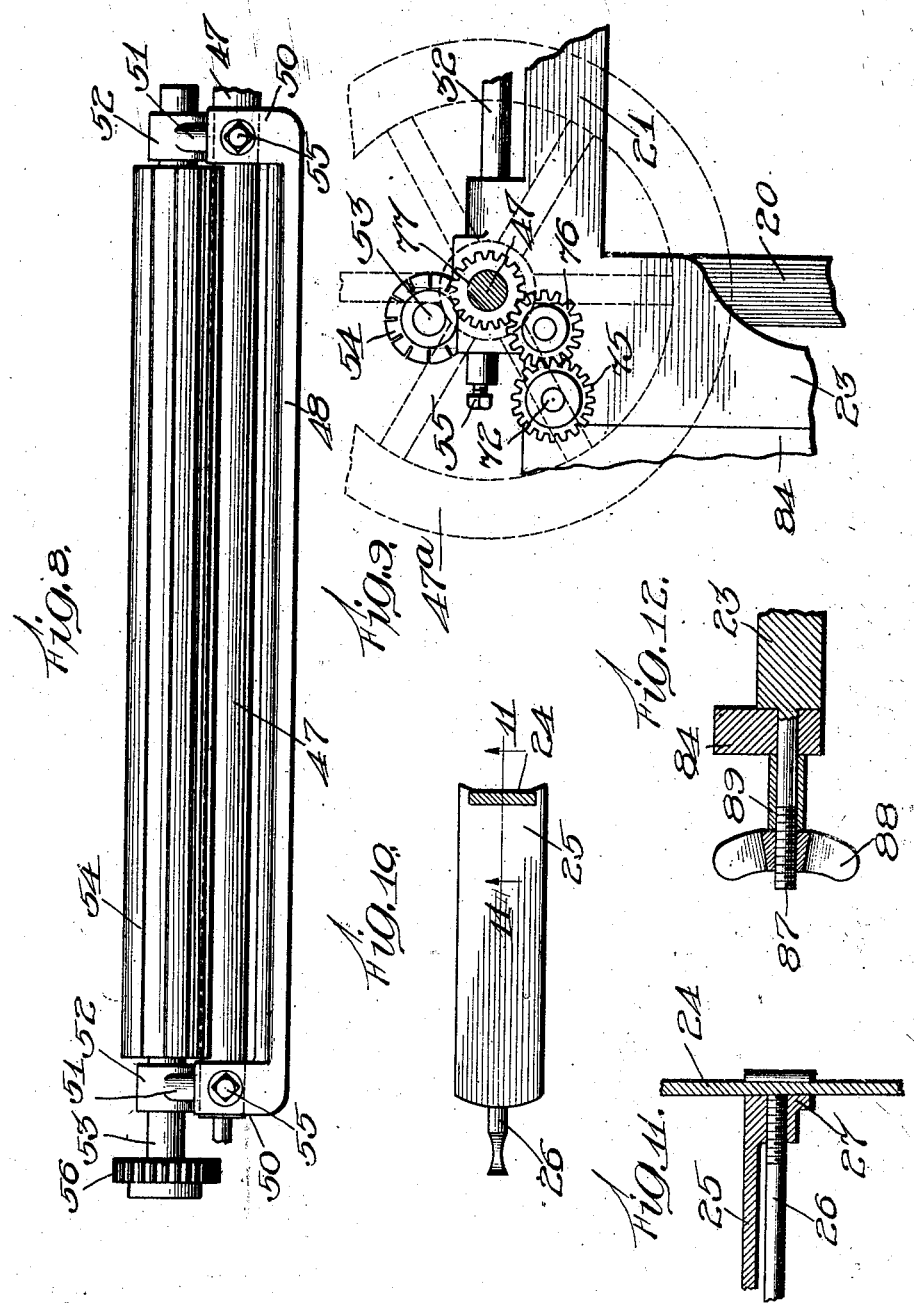

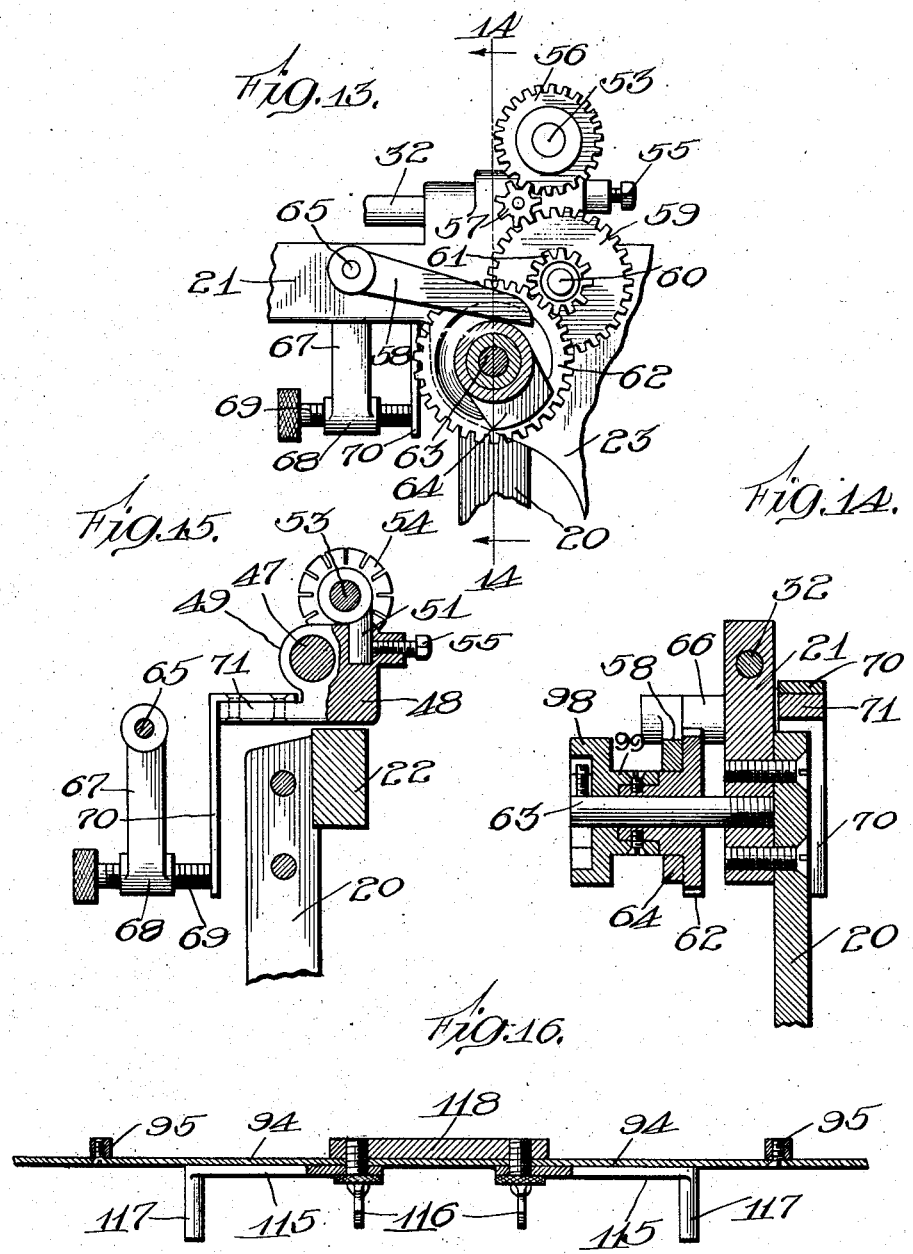

UNITED STATES PATENT OFFICE.

FREDERICK G. NIND AND FREDERICK JULYAN, OF CHICAGO, ILLINOIS, ASSIGNORS TO NIND PAPER FOLDER COMPANY, OF CHICAGO, ILLINOIS, A CORPORATION OF ILLINOIS.

PAPER-FOLDING MACHINE.

No. 839,313.   Specification of Letters Patent.   Patented Dec. 25, 1906.

Application filed March 19, 1906. Serial No. 306,841.

*To all whom it may concern:*

Be it known that we, FREDERICK G. NIND and FREDERICK JULYAN, residing at Chicago, in the county of Cook and State of Illinois, have invented certain new and useful Improvements in Paper-Folding Machines, of which the following is a specification, reference being had to the accompanying drawings.

This invention relates to machines designed primarily for folding comparatively small sheets of paper, such as circulars are commonly printed upon. One of the greatest objections to machines of this character has been that while a machine would work perfectly when adjusted for handling a certain kind or grade of paper it could not be depended upon for doing perfect work when another kind or grade of paper was used in connection with it, but would when the kind of paper was changed frequently miss taking a sheet from the pile or would take more than a single sheet. Again, it has been found that even when a machine was employed continuously upon practically the same kind or grade of paper there would at times be considerable difficulty encountered in the proper operation of the machine, owing to the fact that the separate sheets would tend to stick or cling together, due, probably, to atmospheric conditions.

It is one of the principal objects of our invention to provide a machine that can be very readily and delicately adjusted so as to adapt it under all conditions of use and with various kinds and thicknesses of paper to take from a pile of sheets a single sheet and only a single sheet and impart the desired fold thereto.

Other features of our invention are to provide a new and improved roll for frictionally engaging the sheet of paper to be folded, so as to draw it in between such engaging roll and another roll coacting therewith; to provide improved adjustable supports for the pile of sheets so as to regulate the position of the initial fold that is given to the sheet; to provide improved means for imparting to the sheet a second fold parallel with the first fold, and to improve generally the construction and operation of machines of this character.

These objects we accomplish by the means shown in the drawings and hereinafter specifically described.

Those things that we believe to be new will be set forth in the claims.

In the drawings, Figure 1 is a side elevation. Fig. 2 is a top or plan view. Fig. 3 is a vertical section taken at line 3 3 of Fig. 2. Fig. 4 is a detail, being a side elevation of the upper end of the curved follower-plate in rear of the pile of sheets and showing also a spring for holding the upper end of the pile of sheets curved backward. Fig. 5 is a rear elevation, the curved follower-plate and some of the devices at one end of the machine being broken away. Fig. 6 is a front elevation. Fig. 7 is a vertical section taken at line 7 7 of Fig. 3, the drums and pulleys over which the tapes pass being shown, however, in elevation. Fig. 8 is a detail, being a front elevation of the rocking frame and the paper-engaging roll carried thereby, showing also the fixed roll that coöperates with the first-mentioned roll to impart the initial fold to the sheets that successively pass between them. Fig. 9 is a view of the two rolls shown in Fig. 8, the paper-engaging roll being shown in end elevation and the other roll being shown in section, the view also showing the arrangement of gears through which is driven the upper roll that carries the tapes that guide the sheets into position to be acted upon for receiving a second fold, the driving-pulley that is secured on the end of the roll that coöperates with the paper-engaging roll being shown in dotted lines. Fig. 10 is a detail, being a plan view of one of the adjustable supports on which the pile of sheets rests on edge, the vertical bar on which the support is slidingly mounted being shown in section. Fig. 11 is a vertical section at line 11 11 of Fig. 10. Fig. 12 is a detail, being a section at line 12 12 of Fig. 3 and showing the means near each side of the machine for connecting the frames carrying the two folding devices. Fig. 13 is a detail, illustrating the devices for rocking the frame that carries the paper-engaging roll and for regulating the pressure with which such roll is forced successively against the different sheets of paper. Fig. 14 is a vertical section at line 14 14 of Fig. 13. Fig. 15 is a detail, partly in vertical section, showing more clearly than in Fig. 13 the means for regulating the degree of pressure with which the paper-engaging roll is forced against the sheets of paper. Fig. 16 is a horizontal section taken at line 16 16 of Fig. 6 and illustrating the adjustable means for supporting the sheets of paper preparatory to receiving their second fold.

Referring to the several figures of the drawings, in which corresponding parts are indicated by like reference-numerals, 20 indicates supporting-standards, a pair of such being provided at opposite sides of the machine, to which is suitably secured by bolting or otherwise the main frame, consisting of two longitudinally-extending side bars 21 and a cross-bar 22 at the forward ends of the side bars 21. We prefer to make these bars 21 22 integral, but they of course may be formed separately and suitably united. Formed with the frame 21 22 are two downwardly-extending brackets 23, against the vertical outer faces of which is adapted to be placed a supplemental frame carrying the devices that impart the second fold to the sheets of paper, which last-named devices will hereinafter be more specifically described.

24 indicates vertical bars secured near their upper ends to the rear face of the cross-bar 22 by screws, as indicated in dotted lines in Fig. 3, or otherwise. As shown in said Fig. 3, washers are interposed between the bars 24 and the cross-bars 22, so as to bring the rear face of each bar 24 in line with the rear side of the small one of the folding-rolls, that will be hereinafter described. 25 indicates horizontal supports that at their forward ends are provided with guiding-grooves that partially embrace these vertical bars 24, this construction permitting the supports to move freely up and down on the bars 24. They are held in any desired position on the bars 24 by means of a set-screw 26, with which each support is provided, said set-screw screwing into an enlarged head 27, depending from the forward end of the support, and said set-screw near its outer end being supported by a depending bracket 28. It is obvious that upon turning the set-screw 26 its end will impinge against the face of the bar 24 with which its support is connected. These vertical bars 24 in addition to forming guides upon which the supports 25 can be adjusted form also bearing-strips against which the front of the pile of sheets supported on the parts 25 will come, and as the faces of these bars or strips 24 are of polished metal the sheets of paper when drawn between the folding-rolls, as hereinafter described, will move upward against such bars or strips with but little friction.

29 30 indicate a sliding frame, 29 representing two parallel side bars, and 30 a cross-head formed therewith. The parallel side bars 29 have laterally-extending ears 31, through which pass guide-rods 32, that are each secured at its forward end to a raised portion 33, formed on the sides 21 of the main frame, and are supported in ears 34, formed near the rear ends of the sides 21.

35 indicates a follower-plate secured by screws or otherwise to the front face of the cross-head 30, such follower-plate extending in a vertical direction downward from such cross-head, but above such cross-head being curved or bent to project rearwardly, as clearly shown in Figs. 1 and 3. In the vertical portion of the follower-plate are wide slots 36, (see Fig. 5,) through which the supports 25 for the pile of sheets of paper project.

37 37 indicate two rack-bars, each suitably secured to one of the side bars 29 of the sliding frame that carries the follower-plate, which rack-bars in the construction shown lie below the lower edges of the side bars 29 and project slightly in rear of said side bars. In the construction shown these rack-bars are each secured in place by screws 38 and 39, the screw 38 passing through a vertical ear 40 and into the inner face of the side bar and the screw 39 passing through a horizontal ear 41 into a projection 42, cast with the side bar.

43 indicates a pair of coiled springs, each secured at its forward end to the forward one of the pair of uprights 20 and extending therefrom to the rear in a diagonal direction and connected to a rod 44, which rod is adapted to be placed in any one of the notches in the parallel rack-bars 37. By this means the tension of the springs can be adjusted as required by shifting the rod 44 into any one of the several notches provided, and the movable frame 29 30, with the follower-plate secured thereto, will be forced forward with the required degree of pressure to present the pile of sheets carried on the supports 25 against the bars or strips 24 and the fixed folding-roll, hereinbefore referred to, which projects over the ends of such bars or strips. The pile of sheets of paper shown in the drawings is indicated by 45.

The upper portion of the follower-plate 35 is shown as being bent to incline it to the rear, as has already been mentioned, and this is for the purpose of permitting the upper portion of the pile of sheets to be correspondingly inclined backward, so as to insure such pile being out of contact with the rocking paper-engaging roll, except at regular intervals, when such roll is rocked forward against the pile. In order that the pile of sheets may be so held backward, we provide a suitable spring 46, which is secured to the upper end of the follower-plate 35 and is bent over and bears upon the top of the pile of sheets, thus holding the upper end of the pile of sheets at the desired angle and against the follower-plate; but the pressure of the spring is of course not so strong as to prevent the outer sheet from being readily pulled from beneath the spring. This holding-spring is shown in Fig. 4.

47 indicates a roll, preferably of steel and having a smooth polished surface. This roll is suitably journaled in the main frame of the machine a short distance above the cross-bar 22 of such main frame. Upon one of the projecting ends of this roll 47 is fixedly secured in any suitable manner a driving wheel or pulley 47ª.

48 indicates a bar loosely suspended from the roll 47 by means of ears 49 at each end of the bar 48, such ears being projected slightly to the rear. This rocking bar 48 lies closely beneath the roll 47, but out of contact therewith, (see Fig. 3,) and extends forward of such roll. Its ends are upturned, as at 50, (see Fig. 8,) in which upturned ends are formed sockets into which project studs 51, formed on collars 52, in which collars is journaled a shaft 53, that has secured upon it between the collars 52 a paper-engaging roll 54. By means of suitable set-screws 55, passing through the sides of the socketed ends 50 and engaging the studs 51, the shaft 53, with the roll 54 thereon, can be adjusted as desired, so as to regulate the degree of pressure with which said paper-engaging roll 54 bears against the smooth roll 47. This paper-engaging roll 54 is in the construction shown formed of a yielding material, preferably rubber, and is provided in its surface with a number of longitudinal slits extending from end to end, and this slitting of the rubber we have found to be productive of the best results in that it insures more positive engagement of the sheet of paper that is to be drawn from a pile when the roll is forced against such pile and rotated.

56 indicates a gear located on that end of the shaft 53 that projects opposite the side of the machine from that at which the driving pulley or wheel is located, such end of the shaft projecting so as to bring said gear close to the outer face of the main frame.

57 indicates a small pinion secured upon the projecting end of the roll 47, such projecting end being diminished in size, as indicated in Fig. 13, in order to have this pinion mounted upon it. This pinion 57 meshes with a gear 59, journaled upon a pin 60, projecting from the frame. Upon this pin 60 is also journaled a pinion 61, made fast to the face of the gear 59, said pinion meshing with a gear 62, journaled on a pin 63, projecting from the main frame.

64 indicates a cam made fast to the face of the gear 62 so as to turn therewith.

58 indicates an arm having its free forward end projected over the path of the cam 64, so as to be intermittently rocked by such cam. The rear end of the arm 58 is affixed in any suitable manner to a short rock-shaft 65, that passes through one of the upper side bars 21 of the main frame, such rock-shaft 65 in the construction shown being suitably journaled in a stud 66, formed with and projecting from such upper side bar 21. (See Fig. 2.) On the inner end of this short rock-shaft 65 is rigidly attached a downwardly-depending arm 67, carrying at its lower end an interiorly-screw-threaded sleeve 68, through which passes a suitable set-screw 69, the inner end of which bears against a rigid finger 70, that is securely affixed at its upper end to a rearwardly-extending projection 71, formed with or suitably united to the rocking bar 48.

The operation of the parts so far described is as follows: A pile of sheets of paper is to be placed in the machine with the lower edges of the sheets of the pile resting upon the supports 25 and the upper part of the pile being bent back to conform to the inclination of the upper part of the follower-plate, in which inclined position they will be held by inserting the upper ends of the sheets beneath the spring 46. Prior to inserting the pile of sheets in place the supports 25 will be adjusted to the required height in order to insure the fold that is to be imparted to the sheets being at the right place on the sheets, for it will be understood that by such adjustment the initial fold that is imparted to the sheets passing between the smooth roll 47 and the yielding roll 54 can be made at any desired place across the paper. By this means this initial fold can be made so as to fold the sheet across its center to adapt it to be given subsequent folds by hand or by other mechanical devices to adapt it to go into an ordinary small envelop, or it can be folded about a third of the way from one end, thus leaving it in shape to be given another fold about a third of the way from its opposite end, as is done by the remaining parts of the present machine, to be described hereinafter, which will adapt it to go into an envelop whose length corresponds approximately to the width of the sheet of paper thus folded. After the pile of sheets has been placed in the machine and with the supports 25 adjusted as desired the rod 44, to which the rear ends of the springs 43 are connected, is pulled up and placed in the desired notch of the rack-bar 37. This insures the follower-plate being held with the desired pressure against the pile of sheets, so that such pile of sheets will at all times be held in engagement with the bars or strips 24 and also against the surface of the smooth roll 47, that is located just above these bars or strips 24. Power is then applied to the machine through the wheel or pulley 47ª, and as such wheel or pulley 47ª is fast upon the roll 47 the turning of the roll causes the turning of the other and larger roll 54 in the opposite direction to the turning of the roll 47, such turning of the roll 54 being caused, of course, by the engagement of the pinion 57 with the gear 56, that is fast on the shaft 53, that carries such roll 54. Through the remaining gears and pinions described the cam 64 will, of course, also be rotated and as it turns it will lift the free end of the arm 58, causing a turning of the short rock-shaft 65, to which such arm is affixed, and such movement of the rock-shaft will force forward the downwardly-depending arm 67, which, bearing against the rigid finger 70, that is carried by the projection 71 on the bar 48, causes such bar to rock, the rocking being permitted by reason of such bar being loosely mounted by its ears 49 on the smooth roll 47, as before explained. This rocking of the bar 48 carries the paper-engaging roll 54 backward and brings it in contact with the outermost sheet of the pile of sheets. The rocking of this roll 54 does not disengage the gear 56, carried on the same shaft, from the pinion 57, and consequently the roll is at all times being rotated. The effect of the rotating roll upon the sheet of paper that it comes in contact with is to draw down the upper part of the sheet, causing it to buckle opposite the bite of the two rolls, and consequently to be caught between the two rolls and be drawn between them, thus imparting to the sheet of paper the desired fold in the well-known manner. Before the sheet has passed entirely between the rolls the cam 64 will have been turned out of engagement with the arm 58, thus allowing the free end of such arm to drop, and inasmuch as the pivotal connection of the rocking bar 48 is considerably in the rear of the longitudinal center of such bar the weight of the bar will cause it to swing downward and forward, thus of course carrying the paper-engaging roll 54 slightly forward again, so that it will be entirely clear of the pile of sheets when the sheet being operated upon has passed between the rolls. The extent to which the rocking bar can move backward, and consequently the extent to which the roll 54 can move forward away from the pile of sheets, will be regulated by the rear face of such bar coming in contact with the bars or strips 24, or if the screw 69 is turned up sufficient to prevent the rock-bar from touching those bars or strips 24 the rigid finger 70 coming in contact with the end of such set-screw 69 will act as such stop. This set-screw 69 is provided for regulating the degree of pressure with which the paper-engaging roll 54 shall be brought against the pile of sheets, and by its use such roll can be caused to bear with very great or very little force against the pile, which adjustment is of very considerable value, in that it permits of a very ready adjustment and of a very fine adjustment to accommodate the machine to papers of different thicknesses or grades and also to work with equal facility at different times upon the same kind or grade of paper under different atmospheric conditions that affect the separation of a single sheet from a pile.

After a sheet of paper has been folded by passing between the two rolls 47 and 54, as described, it is given an additional fold parallel with the fold just imparted to it, and such additional fold is given by the devices now to be described.

72 indicates a shaft provided in the construction shown with two drums 73, over which pass tapes 74. This shaft 72 is suitably journaled in the forwardly-extending brackets 23. This shaft 72 is extended outside of the main frame at one end, and upon such end is affixed a pinion 75, with which meshes an idler 76, that is driven from a pinion 77, fast on the shaft 47 between the main frame and the hub of the driving wheel or pulley. (See Fig. 2.)

78 indicates a heavy rod depending from the cross-bar 22 of the main frame, to which cross-bar it is suitably affixed. Secured upon this heavy bar 78, near its lower end, is a socket-piece 79, that has formed with it on its forward side a sleeve 80, in which is securely affixed a small rod 81, parallel with the shaft 72, but in the construction shown located somewhat in rear of said shaft 72. (See Fig. 3.) Upon this rod 81 are journaled two pulleys 82, over which the tapes 74 pass. As shown, (see Fig. 5,) the socket-piece 79, that carries the sleeve 80, in which the rod 81 is secured, is made adjustable, by means of a set-screw 83, up and down on the rod 78, by which means the tapes can be tightened as desired.

The devices by which the second folds are imparted to the sheet are supported by a framework consisting of side bars 84 and top and bottom cross-bars 85 and 86, respectively, the said cross-bars having their rear faces in substantially the same plane as the forward faces of the side bars in the construction shown. (See Figs. 2 and 3.) This supporting-frame that carries the second folding devices fits up against the forward ends of the brackets 23, from which brackets project screws 87, which pass through suitable openings in the side bars 84, and upon the outer ends of which are screwed thumb-nuts 88, which in the construction shown bear against elongated washers 89, interposed between the thumb-nuts and the outer faces of the side bars 84.

90 indicates a rock-shaft suitably journaled in eyes 91, formed in the lower ends of two heavy rods 92, that are secured to the lower ends of the side bar 84 and which, in effect, form extensions of such side bar. In the construction shown these heavy rods 92 enter sockets formed in the lower ends of the said side bars 84 and are adjustably held therein by set-screws 93. (See Fig. 1.) 94 indicates a plate carried by said rock-shaft 90, the attachment to such rock-shaft being by means of two small bars 95, which are rigidly secured at their lower ends to such rock-shaft, and to which bars the plate 94 is secured by screws 96 or otherwise. One end of the shaft 90 projects at one side of the machine and has rigidly secured thereto one end of an arm 97, the upper end of said arm projecting slightly to the rear and engaging with a cam 98, loosely mounted on the pin 63, on which the other cam 64 is also mounted. This cam 98 has a hub portion 99, secured to the face of the cam 64, so that both of said cams turn together on said pin 63. As shown, the greater portion of the surface of this cam 98 is concentric with the pin 63, and the size of the cam 98 is such that during the time that the upper end of the arm 97 is in contact with this concentric portion the arm will hold the rock-shaft turned to draw back the plate 94 to the position indicated in Fig. 3; but immediately upon the cam turning, so as to cause the end of the said arm 97 to leave the concentric portion of the cam, the rock-shaft 90 will be turned and force the plate 94 to the forward limit of its motion, this turning of the rock-shaft at this time being accomplished by means of a coiled spring 100, that is secured at its lower end to the outer end of a short projecting pin 101, secured to such rock-shaft, the other end of the spring being suitably secured to one of the side bars 84, as clearly shown in Fig. 3. In order to permit of the backward turning of the plate 94, as shown in Fig. 3, without interfering with the tapes 74, the plate is provided with wide slots 102. (See Figs. 6 and 7.)

103 and 104 indicate a pair of folding-rolls suitably secured upon shafts 105 and 106, respectively, which are journaled in suitable bearings 107 and 108, secured upon the outer faces of the side bars 84.

109 indicates an idler-pinion journaled upon a pin 110, that projects from one of the side bars 84 and meshes with the gear 59. This idler 109 also meshes with a pinion 111, fast on the shaft 105, that in turn meshes with a pinion 112, fast on the shaft 106, and through this arrangement of gearing the second pair of folding-rolls 103 and 104 are driven in opposite directions.

113 113 indicate a pair of light spring-fingers attached to the upper cross-bar 85 and act to aid in deflecting a folded sheet that passes from between the rolls 47 and 54 down behind the second pair of folding-rolls 103 and 104. 114 114 indicate a second pair of light spring-fingers, between which and the plate 94 the lower edge of the once-folded sheet is lightly held for a very brief space of time when the said plate is swung forward.

115 115 indicate a pair of arms attached to the front face of the plate 94, the attachment in the construction shown being by means of set-screws 116 passing through such arms near the end of each arm. On the rear face of the plate 94 is placed a reinforcing-block 118, (see Fig. 16,) into which the set-screws 116 can pass. At the opposite ends of the arms forwardly-projecting pins 117 are provided on which the sheet of paper to be given its second fold by the pair of rolls 103 and 104 rests. By means of the set-screws 116 the outer ends of the arms to which the said pins 117 are attached can be adjusted up or down, as required, so as to have the paper come to rest on such pins to bring the desired portion of the paper opposite the said second pair of folding-rolls.

The operation of the devices for imparting the second fold is as follows: A sheet of paper folded by the first pair of folding-rolls 47 and 54 will have its leading edge turned downward by the light spring-fingers 113, and the action of the moving tapes 74 insures the sheet being evenly carried down. At the time such sheet is being so carried down the action of the cam 98 on the arm 97 will cause the plate carried by the rock-shaft 90 to be held back against the action of the coiled spring 100 in the position shown in Fig. 3. The plate therefore offers no obstruction whatever to the downward passage of the paper, and such paper will pass freely down until it rests upon the pins 117, carried by the adjustable arms 115. Thereafter when the cam 98 has been turned far enough to allow the free end of the arm 97 to pass off from the concentric portion of such cam the action of the coiled spring 100 will immediately cause the rock-shaft 90 to turn and swing the plate 94 forward and against the sheet of paper. It will be noted that the upper end of this plate 94 is turned so that its upper edge comes opposite the point of contact of the two folding-rollers 103 and 104, and such edge of course buckles the sheet of paper inward, so that it is caught between such rolls and will by the turning action of such rolls be drawn between them, and thus be given its second fold, which second fold, as before stated, is parallel with the initial fold given to the sheet by the first pair of folding-rolls.

By properly adjusting the supports 25, on which the pile of sheets is first placed, and by also properly adjusting the supporting-arms 115, upon which the sheets are successively supported prior to receiving their second fold, it will be evident that the two folds imparted to a sheet can be produced at equal distances from the ends of the sheet, thereby adapting the sheet for ready insertion in an ordinary long envelop that is adapted to take sheets of letter size folded twice upon themselves. It is also evident that the supporting parts referred to can be so adjusted as to insure the sheet of paper being folded centrally in the first instance and then next be folded again upon its center, so as to produce four thicknesses of paper adapted for insertion in an envelop of the size referred to.

It is desirable in machines of this character that impart folds such as above described to have means provided for accurately creasing such folded sheets along a line at exactly right angles to the folds imparted, whereby an additional fold in an opposite direction may be given by hand to the folded sheets to adapt them for insertion in an ordinary small envelop or for other purposes. Furthermore, inasmuch as various sizes of sheets of paper are adapted to be folded in our machine it is desirable that such creasing device be made adjustable from side to side of the machine, so that the desired crease may be imparted to the folded sheet at the desired point. To accomplish this, we have provided the devices now about to be explained.

119 indicates a bar secured to the front face of the lower cross-bar 86, said bar 119 having outwardly-turned arms 120, in which is journaled a shaft 121, provided at one end with a gear 122, fast thereon, with which gear meshes an idler 123, that also meshes with the pinion 112 on the shaft 106, so that as said shaft 106 turns the shaft 121 turns in the same direction. Upon this shaft is slidingly secured, by means of a set-screw 124 passing through its hub, a disk 125, having a groove in its periphery, the upper part of such disk being just below the bite of the second pair of folding-rolls 103 104.

126 indicates a sharp-edged creasing-wheel mounted in the construction shown in a forked arm 127, that is slidingly mounted on a rod 128, extending across the front of the machine just above the upper folding-roll 103, said rod being supported in suitable brackets 129, secured to the outer face of the upper cross-bar 85.

130 indicates a flat spring secured by a screw in the construction shown to the upper edge of the upper cross-bar 85 and bearing at its other end against the forked arm, to which it is secured in any suitable manner. The creasing-wheel 126 rests in the groove of the disk 125 and is held pressed against said disk by the said spring 130. As shown, (see Fig. 2,) the upper edge of the cross-bar 85 is provided with a number of holes, into any one of which the screw which holds the spring 130 can be inserted, and as this spring is moved from one point to another the creasing-wheel arm 127 will freely slide along the rod 128, upon which it is pivotally mounted. The adjustment of the coacting grooved disk can be effected by loosening its set-screw 124, as is apparent.

By our invention we provide a machine capable of imparting a plurality of parallel folds to sheets of paper of varying size and of different thicknesses, and to which paper after being so folded can be imparted a crease wherever desired at right angles to such folds.

What we claim as our invention, and desire to secure by Letters Patent, is—

1. In a paper-folding machine, the combination with means for supporting a pile of sheets, of folding mechanism comprising a roll and a second member adapted to coöperate therewith to produce a fold, means for rotating said roll, and means for intermittently pressing said roll against said pile of sheets.

2. In a paper-folding machine, the combination with means for supporting a pile of sheets, of a pair of folding-rolls, means for intermittently moving one of said rolls toward and against said pile of sheets, and means for rotating said last-named roll.

3. In a paper-folding machine, the combination with means for supporting a pile of sheets, of a pair of folding-rolls, means for intermittently moving one of said rolls toward and against said pile of sheets, and means for continuously rotating both of said rolls.

4. In a paper-folding machine, the combination with means for supporting a pile of sheets, of a pair of folding-rolls, means for moving one of said rolls against the pile of sheets and holding it in that position until the outer sheet of the pile has been caught and partly passed between said rolls and then moving it and said single sheet away from said pile, and means for rotating said roll.

5. In a paper-folding machine, the combination with means for supporting a pile of sheets, of a pair of folding-rolls, one of said rolls being pivotally connected with the other so as to permit of its being rocked, means for rocking said pivoted roll toward and away from said pile of sheets, and means for rotating it while in both of said positions.

6. In a paper-folding machine, the combination with means for supporting a pile of sheets, of a pair of folding-rolls, one of said rolls being pivotally connected with the other so as to permit of its being rocked, means for rocking said pivoted roll toward and away from said pile of sheets, and means for rotating both of said rolls during the rocking of said pivoted roll.

7. In a paper-folding machine, the combination with means for supporting a pile of sheets, of a smooth roll journaled in fixed bearings and in contact with a pile of sheets carried by said supporting means, a second roll adapted to frictionally engage the outer sheet of the pile and cause it to be drawn between said two rolls, means for holding said last-named roll in engagement with said pile for a limited time and then be moved away from said pile, and means for rotating said engaging roll in its different positions.

8. In a paper-folding machine, the combination with means for supporting a pile of sheets, of folding mechanism comprising a roll and a second member adapted to coöperate therewith, of a rocking bar in which said roll is journaled, means for rocking said bar to move said roll against and away from said pile of sheets, and means for rotating said roll in its different positions.

9. In a paper-folding machine, the combination with means for supporting a pile of sheets, of a pair of folding-rolls, a rocking bar in which one of said rolls is journaled, said rocking bar being supported from the other one of said rolls, means for rocking said bar to move the roll carried thereby against and away from said pile of sheets, and means for rotating said roll in its different positions.

10. In a paper-folding machine, the combination with means for supporting a pile of sheets, of a pair of folding-rolls, a rocking bar in which one of said rolls is journaled, means for rocking said bar to move the roll carried thereby against and away from said pile of sheets, and intermeshing gears connected with said rolls for driving them in opposite directions.

11. In a paper-folding machine, the combination with means for supporting a pile of sheets, of folding mechanism comprising a roll and a second member adapted to coöperate therewith to produce a fold, means for rotating said roll, means for intermittently pressing said roll against said pile of sheets, and means for varying the pressure of said roll against said pile of sheets.

12. In a paper-folding machine, the combination with means for supporting a pile of sheets, of folding mechanism comprising a roll and a second member adapted to coöperate therewith to produce a fold, a rocking bar in which said roll is journaled, means for rotating said roll, means for intermittently pressing said roll against said pile of sheets, and means for regulating the amount of rocking movement of said bar.

13. In a paper-folding machine, the combination with means for supporting a pile of sheets, of folding mechanism comprising a roll and a second member adapted to coöperate therewith to produce a fold, a rocking bar in which said roll is journaled, an arm on said bar, a rock-shaft, means connected with said rock-shaft for engaging said arm to cause a rocking movement of said bar, and means for actuating said rock-shaft.

14. In a paper-folding machine, the combination with means for supporting a pile of sheets, of folding mechanism comprising a roll and a second member adapted to coöperate therewith to produce a fold, a rocking bar in which said roll is journaled, an arm on said bar, a rock-shaft, an adjustable device connected with said rock-shaft for engaging said arm, and means for actuating said rock-shaft.

15. In a paper-folding machine, the combination with means for supporting a pile of sheets, of folding mechanism comprising a roll and a second member adapted to coöperate therewith to produce a fold, a rocking bar in which said roll is journaled, an arm on said bar, a rock-shaft, a downwardly-depending arm secured to the rock-shaft, a screw passing through said last-mentioned arm and adapted to come in contact with the arm on said rocking bar, and means for actuating said rock-shaft.

16. In a paper-folding machine, the combination with means for supporting a pile of sheets, of folding mechanism comprising a roll and a second member adapted to coöperate therewith to produce a fold, a rocking bar in which said roll is journaled, said rocking bar being pivoted at one side of its longitudinal center, means for rotating said roll, and means for intermittently rocking said bar and the roll carried thereby to bring said roll against the pile of sheets.

17. In a paper-folding machine, the combination with means for supporting a pile of sheets, a pair of folding-rolls, one of said rolls being mounted in stationary bearings and adapted to lie in constant engagement with said pile of sheets and the other of said rolls being mounted in movable bearings, means for moving said last-named roll toward and away from said pile of sheets, and means for holding the upper portions of the sheets of the pile inclined away from the movable roll to prevent said roll engaging therewith except when rocked against said pile.

18. In a paper-folding machine, the combination with a pair of folding-rolls and means for rotating them, of means for supporting a pile of sheets on edge opposite said rolls, and a follower-plate adapted to bear against the rear of the pile of sheets, said follower-plate having its lower portion substantially vertical and its upper portion inclined away from said folding-rolls.

19. In a paper-folding machine, the combination with a pair of folding-rolls and means for rotating them of means for supporting a pile of sheets on edge opposite said rolls, a follower-plate adapted to bear against the rear of the pile of sheets, said follower-plate having its lower portion substantially vertical and its upper portion inclined away from said folding-rolls, and means for holding the upper portion of the pile of sheets turned back against said inclined portion.

20. In a paper-folding machine, the combination with a supporting-frame, of a pair of folding-rolls, a vertical bar or strip secured to the frame beneath said rolls, a support for the sheets to be folded adjustably connected to the said bar or strip, a follower-plate adapted to be placed in rear of the sheets to be folded, said follower-plate being slotted to permit the said support to project through it, and means carried by the said frame for adjustably supporting said follower-plate.

21. In a paper-folding machine, the combination with a supporting-frame, of a pair of folding-rolls, a vertical bar or strip secured to the frame beneath said rolls, a support for the sheets to be folded adjustably connected to the said bar or strip, a follower-plate adapted to be placed in rear of the sheets to be folded, said follower-plate being slotted to permit the said support to project through it, means carried by the said frame for adjustably supporting said follower-plate, and a spring for holding said follower-plate against the sheets.

22. In a paper-folding machine, the combination with a supporting-frame, of a pair of folding-rolls, means for supporting a pile of sheets on edge opposite said rolls, a sliding frame comprising two side bars and a crosshead at the forward ends of said arms, a follower-plate secured to said sliding frame, guides on the supporting-frame for said sliding frame, and a spring connected to said sliding frame and said supporting-frame to keep the follower-plate against the pile of papers.

23. In a paper-folding machine, the combination with a supporting-frame, of a pair of folding-rolls, means for supporting a pile of sheets on edge opposite said rolls, a sliding frame comprising two side bars and a crosshead at the forward ends of said arms, a follower-plate secured to said sliding frame, guides on the supporting-frame for said sliding frame, rack-bars on the said side bars, coiled springs connected at their forward ends to the supporting-frame, and a rod adapted to be engaged by said rack-bars, said springs being connected at their rear ends to said rod.

24. In a paper-folding machine, the combination with a rocking plate, of a pair of folding-rolls, a support carried by the plate for the sheet of paper to be folded, means for feeding the sheet between said plate and rolls, and means for rocking said plate to press said sheet against and between the rolls.

25. In a paper-folding machine, the combination with a rocking plate, of a pair of folding-rolls, an adjustable support carried by the plate for the sheet of paper to be folded, means for feeding the sheet between said plate and rolls, and means for rocking said plate to press said sheet against and between the rolls.

26. In a paper-folding machine, the combination with a rocking plate, of a pair of folding-rolls, an adjustable support carried by the plate for the sheet of paper to be folded, said support consisting of a pivoted arm carrying a projecting pin, means for feeding the sheet between said plate and rolls, and means for rocking said plate to press said sheet against and between the rolls.

27. In a paper-folding machine, the combination with a supporting-frame and a pair of folding-rolls journaled therein, of two rods depending from the said frame and adjustable vertically, said rods having openings in their lower ends, a rock-shaft held in said openings, a plate attached at its lower end to said rock-shaft, means for feeding a sheet of paper between said plate and pair of rolls, and means for turning said rock-shaft to cause said plate to press the sheet against the rolls.

28. In a paper-folding machine, the combination with a supporting-frame and a pair of folding-rolls, of a rock-shaft journaled in suitable supports, a plate attached to said rock-shaft, an endless tape for guiding a sheet of paper between said plate and rolls, said plate being slotted to prevent interference with the tape when said plate is turned back, means for moving said tape, and means for turning said rock-shaft to cause said plate to press the sheet against the rolls.

29. In a paper-folding machine, the combination with a supporting-frame and a pair of folding-rolls, of a rock-shaft journaled in suitable supports, a plate attached to said rock-shaft, an endless tape for guiding a sheet of paper between said plate and rolls, a rotatable shaft located over said plate, a drum on said shaft over which said tape passes, a rod parallel with said shaft and located below it over which the tape also passes, and means for turning the said rock-shaft to cause the plate carried thereby to press the sheet against the said folding-rolls.

30. In a paper-folding machine, the combination with a supporting-frame and a pair of folding-rolls, of a rock-shaft journaled in suitable supports, a plate attached to said rock-shaft, an endless tape for guiding a sheet of paper between said plate and rolls, a rotatable shaft located over said plate, a drum on said shaft over which said tape passes, a rod parallel with said shaft and located below it over which said tape also passes, means for vertically adjusting said rod, and means for turning said rock-shaft to cause the plate carried thereby to press the sheet against the said folding-rolls.

FREDERICK G. NIND.
FREDERICK JULYAN.

Witnesses:
ALBERT H. ADAMS,
WILLIAM H. DE BUSK.